United States Patent
Nakagawara et al.

(10) Patent No.: US 11,001,252 B2
(45) Date of Patent: May 11, 2021

(54) HYBRID VEHICLE DRIVE SYSTEM

(71) Applicant: Honda Motor Co., Ltd., Tokyo (JP)

(72) Inventors: Akiko Nakagawara, Wako (JP); Takahiro Kasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 271 days.

(21) Appl. No.: 16/392,554

(22) Filed: Apr. 23, 2019

(65) Prior Publication Data

US 2019/0351894 A1 Nov. 21, 2019

(30) Foreign Application Priority Data

May 15, 2018 (JP) .............................. JP2018-093802

(51) Int. Cl.
*B60W 20/40* (2016.01)
*B60K 6/40* (2007.10)
(Continued)

(52) U.S. Cl.
CPC ............. *B60W 20/40* (2013.01); *B60K 6/365* (2013.01); *B60K 6/383* (2013.01); *B60K 6/387* (2013.01);
(Continued)

(58) Field of Classification Search
CPC ...... B60K 2006/381; B60K 6/24; B60K 6/26; B60K 6/365; B60K 6/383; B60K 6/387; B60K 6/40; B60K 6/445; B60K 6/547; B60W 10/02; B60W 10/06; B60W 10/08; B60W 10/115; B60W 20/30; B60W 20/40; B60W 2520/10; B60W 2520/105; B60W 2710/021; B60W 2710/0666; B60W 2710/10; B60W 30/19; B60Y 2200/92; B60Y 2400/427; B60Y 2400/60; F16H 3/728

See application file for complete search history.

(56) References Cited

U.S. PATENT DOCUMENTS 6,244,368 B1 * 6/2001 Ando .................... B60K 6/543
180/65.25
6,247,437 B1 * 6/2001 Yamaguchi ............. B60L 50/16
123/179.3
(Continued)

FOREIGN PATENT DOCUMENTS

JP 2012240551 A 12/2012

*Primary Examiner* — Babar Sarwar
(74) *Attorney, Agent, or Firm* — Duft & Bornsen, PC

(57) ABSTRACT

A vehicle drive apparatus including a speed change mechanism, a first and second motor-generators, and a microprocessor. The microprocessor is configured to perform controlling the speed change mechanism, the first motor-generator and the second motor-generator so as to switch a speed range to a low-speed range, operate the first motor-generator as a motor and operate the second motor-generator as a generator when a vehicle speed is equal to or greater than a predetermined vehicle speed and an acceleration instruction is detected, and so as to switch the speed range to a high-speed range, operate the first motor-generator as a generator and operate the second motor-generator as a motor when the vehicle speed is equal to or greater than the predetermined vehicle speed and a deceleration instruction or a termination instruction of an acceleration is detected.

8 Claims, 11 Drawing Sheets

(51) Int. Cl.
*B60K 6/547* (2007.10)
*B60K 6/383* (2007.10)
*B60W 10/115* (2012.01)
*B60W 10/08* (2006.01)
*B60K 6/387* (2007.10)
*B60W 10/06* (2006.01)
*B60W 10/02* (2006.01)
*B60K 6/445* (2007.10)
*F16H 3/72* (2006.01)
*B60K 6/365* (2007.10)
*B60K 6/24* (2007.10)
*B60K 6/26* (2007.10)

(52) U.S. Cl.
CPC ............... *B60K 6/40* (2013.01); *B60K 6/445* (2013.01); *B60K 6/547* (2013.01); *B60W 10/02* (2013.01); *B60W 10/06* (2013.01); *B60W 10/08* (2013.01); *B60W 10/115* (2013.01); *F16H 3/728* (2013.01); *B60K 6/24* (2013.01); *B60K 6/26* (2013.01); *B60W 2520/10* (2013.01); *B60W 2520/105* (2013.01); *B60W 2710/021* (2013.01); *B60W 2710/0666* (2013.01); *B60W 2710/10* (2013.01); *B60Y 2200/92* (2013.01); *B60Y 2400/427* (2013.01); *B60Y 2400/60* (2013.01)

(56) References Cited

U.S. PATENT DOCUMENTS

| | | | | |
|---|---|---|---|---|
| 6,428,444 | B1* | 8/2002 | Tabata | B60K 6/52 477/3 |
| 8,597,147 | B2* | 12/2013 | Kim | B60K 6/365 475/5 |
| 2003/0042054 | A1* | 3/2003 | Matsubara | B60W 10/18 180/65.225 |
| 2003/0085577 | A1* | 5/2003 | Takaoka | B60W 10/11 290/40 C |
| 2004/0254039 | A1* | 12/2004 | Yasui | B60W 10/08 475/5 |
| 2009/0093330 | A1* | 4/2009 | Kumazaki | B60K 6/445 475/5 |
| 2009/0149295 | A1* | 6/2009 | Yamamoto | B60W 30/18136 477/109 |
| 2010/0227723 | A1* | 9/2010 | Seo | B60K 6/365 475/5 |
| 2011/0053724 | A1* | 3/2011 | Phillips | B60K 6/445 475/5 |
| 2012/0309587 | A1* | 12/2012 | Nozaki | B60W 10/06 477/5 |
| 2013/0066494 | A1* | 3/2013 | Kamijo | B60W 30/20 701/22 |
| 2013/0190955 | A1* | 7/2013 | Halwes | B60K 6/365 701/22 |
| 2013/0297136 | A1* | 11/2013 | Yamanaka | B60L 50/16 701/22 |
| 2013/0325238 | A1* | 12/2013 | Kato | B60W 10/10 701/22 |
| 2014/0129071 | A1* | 5/2014 | Akebono | B60W 20/50 701/22 |
| 2014/0174856 | A1* | 6/2014 | Takagi | F16H 57/0436 184/6.12 |
| 2014/0194238 | A1* | 7/2014 | Ono | B60K 6/365 475/5 |
| 2014/0194239 | A1* | 7/2014 | Ono | B60K 6/50 475/5 |
| 2014/0297079 | A1* | 10/2014 | Saitoh | B60K 6/26 701/22 |
| 2016/0032563 | A1* | 2/2016 | Miyamoto | E02F 9/2075 180/65.265 |

* cited by examiner

|  | BR | CL | OWY | ENG |
|---|---|---|---|---|
| EV MODE | × | × | × | × |
| W MOTOR MODE | × | ○ | ○ | × |
| SERIES MODE | ○ | ○ | × | ○ |
| HV MODE LOW | × | ○ | ○ | ○ |
| HV MODE HIGH | ○ | × | ○ | ○ |

EV MODE

W MOTOR MODE

SERIES MODE

FIRST HV LOW MODE

SECOND HV LOW MODE

HV HIGH MODE

FIRST HV LOW MODE

SECOND HV LOW MODE

HV HIGH MODE

HYBRID VEHICLE DRIVE SYSTEM

CROSS-REFERENCE TO RELATED APPLICATION

This application is based upon and claims the benefit of priority from Japanese Patent Application No. 2018-093802 filed on May 15, 2018, the content of which is incorporated herein by reference.

BACKGROUND OF THE INVENTION

Field of the Invention

This invention relates to a drive system of a hybrid vehicle including a speed change mechanism.

Description of the Related Art

Conventionally, there is a known apparatus of this type that includes a power distribution mechanism for distributing power of an engine serving as main power source to a first electric motor and a transmission member, a second electric motor connected to the transmission member, and a speed change mechanism provided between the transmission member and drive wheels. Such an apparatus is described in, for example, Japanese Unexamined Patent Publication No. 2012-240551 (JP2012-240551A). In the apparatus described in JP2012-240551A, the speed change mechanism includes a pair of friction engagement mechanisms, and when upshift of the speed change mechanism is instructed, one friction engagement mechanism in disengaged state is engaged and the other friction engagement mechanism in engaged state is disengaged so as to switch the speed change mechanism from a low-speed range to a high-speed range.

However, in the apparatus described in JP2012-240551A, when the speed change mechanism is upshifted during traveling at high speed vehicle, amount of heat generated by engaging of the friction engagement mechanism increases. Therefore, it is necessary to improve heat resistance of the friction engagement mechanisms, and thus cost and size increase of the apparatus occurs easily.

SUMMARY OF THE INVENTION

An aspect of the present invention is a drive system of a hybrid vehicle, including: an internal combustion engine; a first motor-generator including a first motor rotating shaft; a speed change mechanism including a first rotating shaft and a second rotating shaft to transmit a rotation input from the first rotating shaft to the second rotating shaft while changing a speed of the rotation; a power division mechanism connected to an output shaft of the internal combustion, the first motor rotating shaft and the first rotating shaft, respectively to divide a power generated by the internal combustion engine to the first motor-generator and the first rotating shaft or to transmit a power generated by the internal combustion engine and the first motor-generator to the first rotating shaft; a path forming portion configured to form a power transmission path transmitting a power output from the second rotating shaft to an axle; a second motor-generator including a second motor rotating shaft connected to the path forming portion; a vehicle speed detector configured to detect a vehicle speed; an instruction detector configured to detect a speed change instruction changing the vehicle speed; and an electric control unit including a microprocessor and a memory configured to control the speed change mechanism, the first motor-generator and the second motor-generator in accordance with the vehicle speed detected by the vehicle speed detector and the speed change instruction detected by the instruction detector. The speed change mechanism includes a friction engagement mechanism including mutually engageable and disengageable members and is configured to switch a speed range to a low-speed range when the friction engagement mechanism is disengaged and to switch the speed range to a high-speed range when the friction engagement mechanism is engaged. The microprocessor is configured to perform the controlling including controlling the speed change mechanism, the first motor-generator and the second motor-generator so as to switch the speed range to the low-speed range, operate the first motor-generator as a motor and operate the second motor-generator as a generator when the vehicle speed detected by the vehicle speed detector is equal to or greater than a predetermined vehicle speed and an acceleration instruction is detected by the instruction detector, and so as to switch the speed range to the high-speed range, operate the first motor-generator as a generator and operate the second motor-generator as a motor when the vehicle speed detected by the vehicle speed detector is equal to or greater than the predetermined vehicle speed and a deceleration instruction or a termination instruction of an acceleration is detected by the instruction detector.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
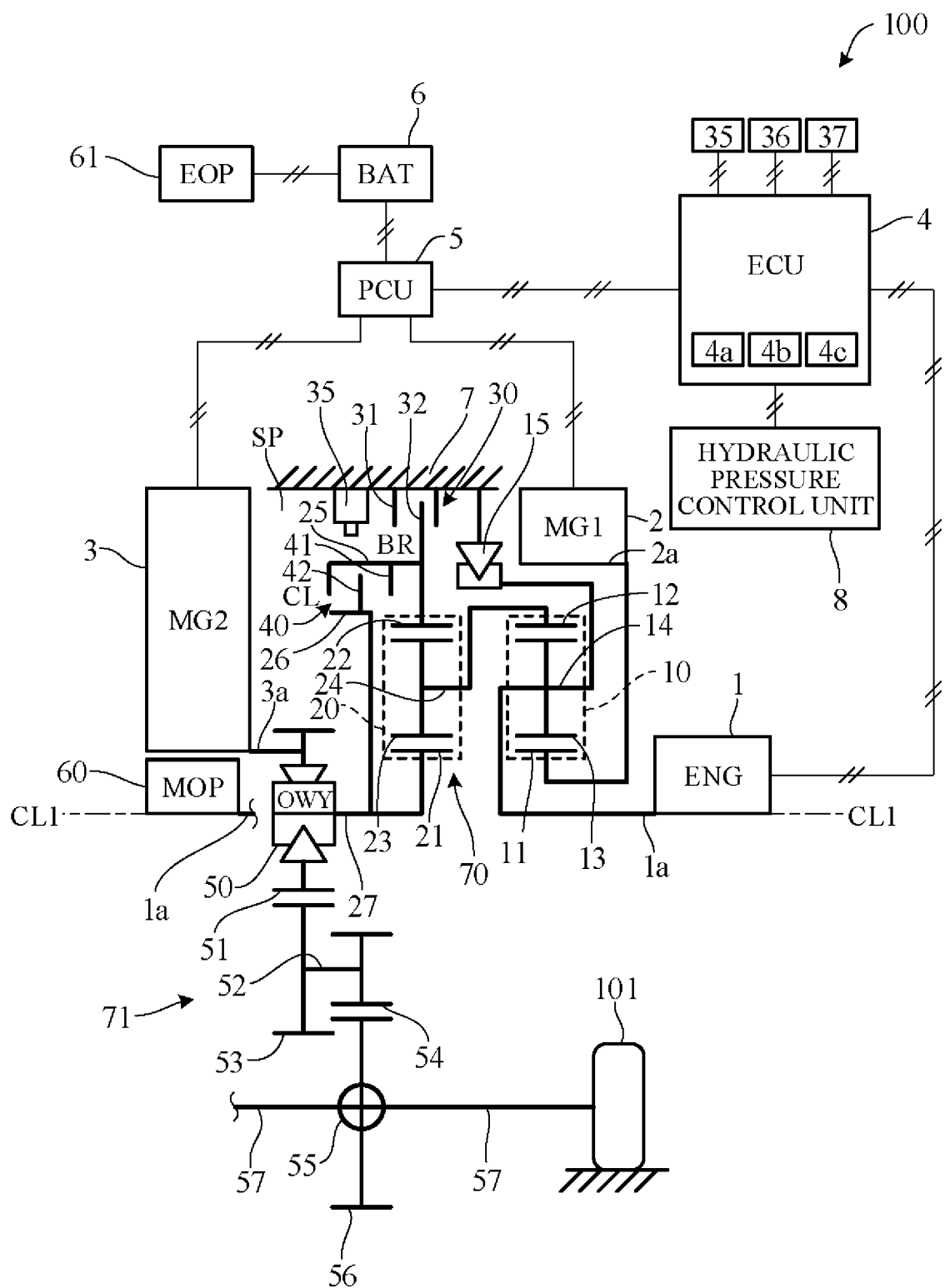
FIG. 1 is a diagram showing schematically a configuration overview of a drive system of a hybrid vehicle according to an embodiment of the invention.

Hereinafter, an embodiment of the present invention is explained with reference to FIGS. 1 to 14. A drive system according to an embodiment of the present invention is applied to a hybrid vehicle including an engine and a motor-generator as a drive power source. FIG. 1 is a diagram showing schematically a configuration overview of a drive system 100 according to the present embodiment.

As shown in FIG. 1, the drive system (drive unit) 100 includes an engine (ENG) 1, first and second motor-generators (MG1 and MG2) 2 and 3, a first planetary gear mechanism 10 for dividing motive power, and a second planetary gear mechanism 20 for changing speed ratio. The drive system 100 is mounted at front of a vehicle, and motive power of the drive system 100 is transmitted to front wheels 101. The vehicle is thus structured as a front-wheel-drive (i.e., FF layout) vehicle.

The engine 1 is an internal combustion engine (e.g., gasoline engine) wherein intake air supplied through a throttle valve and fuel injected from an injector are mixed at an appropriate ratio and thereafter ignited by a sparkplug or the like to burn explosively and thereby generate rotational power. A diesel engine or any of various other types of engine can be used instead of a gasoline engine. Throttle valve opening, quantity of fuel injected from the injector (injection time and injection time period) and ignition time are, inter alia, controlled by a controller (ECU) 4. An output shaft 1a of the engine 1 extends centered on axis (axial line) CL1.

The first and second motor-generators 2 and 3 each has a substantially cylindrical rotor centered on axis CL1 and a substantially cylindrical stator installed around the rotor and can function as a motor and as a generator. Namely, the rotors of the first and second motor-generators 2 and 3 are driven by electric power supplied from a battery (BAT) 6 through a power control unit (PCU) 5 to coils of the stators. In such case, the first and second motor-generators 2 and 3 function as motors.

On the other hand, when rotating shafts 2a and 3a of rotors of the first and second motor-generators 2 and 3 are driven by external forces, the first and second motor-generators 2 and 3 generate electric power that is applied through the power control unit 5 to charge the battery 6. In such case, the first and second motor-generators 2 and 3 function as generators. During normal vehicle traveling, such as during cruising or acceleration, for example, the first motor-generator 2 functions chiefly as a generator and the second motor-generator 3 functions chiefly as a motor. The power control unit 5 incorporates an inverter controlled by instructions from the controller 4 so as to individually control output torque or regenerative torque of the first motor-generator 2 and the second motor-generator 3.

The first motor-generator 2 and the second motor-generator 3 are coaxially installed at spaced locations. The first motor-generator 2 and second motor-generator 3 are, for example, housed in a common case 7, and a space SP between them is enclosed by the case 7. Optionally, the first motor-generator 2 and second motor-generator 3 can be housed in separate cases.

The first planetary gear mechanism 10 and second planetary gear mechanism 20 of single pinion type are installed in the space SP between the first motor-generator 2 and second motor-generator 3. Specifically, the first planetary gear mechanism 10 is situated on the side of the first motor-generator 2 and the second planetary gear mechanism 20 on the side of the second motor-generator 3.

The first planetary gear mechanism 10 includes a first sun gear 11 and a first ring gear 12 installed around the first sun gear 11, both of which rotate around axis CL1, multiple circumferentially spaced first pinions (planetary gears) 13 installed between the first sun gear 11 and first ring gear 12 to mesh with these gears 11 and 12, and a first carrier 14 that supports the first pinions 13 to be individually rotatable around their own axes and collectively revolvable around axis CL1.

Similarly to the first planetary gear mechanism 10, the second planetary gear mechanism 20 includes a second sun gear 21 and a second ring gear 22 installed around the second sun gear 21, both of which rotate around axis CL1, multiple circumferentially spaced second pinions (planetary gears) 23 installed between the second sun gear 21 and second ring gear 22 to mesh with these gears 21 and 22, and a second carrier 24 that supports the second pinions 23 to be individually rotatable around their own axes and collectively revolvable around axis CL1.

The output shaft 1a of the engine 1 is connected to the first carrier 14, and power of the engine 1 is input to the first planetary gear mechanism 10 through the first carrier 14. On the other hand, when the engine 1 is started, power from the first motor-generator 2 is input to the engine 1 through the first planetary gear mechanism 10. The first carrier 14 is connected to a one-way clutch 15 provided on an inner peripheral surface of a surrounding wall of the case 7. The one-way clutch 15 allows forward rotation of the first carrier 14, i.e., rotation in same direction as that of the engine 1, and prohibits reverse rotation. Provision of the one-way clutch 15 prevents the engine 1 from being reversely rotated by reverse torque acting through the first carrier 14.

The first sun gear 11 is connected to the rotating shaft 2a of the rotor of the first motor-generator 2, and the first sun gear 11 and first motor-generator 2 (rotor) rotate integrally. The first ring gear 12 is connected to the second carrier 24, and the first ring gear 12 and second carrier 24 rotate integrally. Owing to this configuration, the first planetary gear mechanism 10 can output power received from the first carrier 14 through the first sun gear 11 to the first motor-generator 2 and output power through the first ring gear 12 to the second carrier 24 on an axle (drive shaft) 57 side. In other words, it can dividedly output power from the engine 1 to the first motor-generator 2 functioning as a generator and the second planetary gear mechanism 20. When the first motor-generator 2 functions as a motor, it is possible to output power from the engine 1 and the first motor-generator 2 to the second planetary gear mechanism 20.

An axis CL1-centered substantially cylindrical outer drum 25 is provided radially outside the second ring gear 22. The second ring gear 22 is connected to and rotates integrally with the outer drum 25. A brake mechanism 30 is provided radially outward of the outer drum 25. The brake mechanism 30 is, for example, structured as a multi-plate wet brake including multiple radially extending plates (friction members) 31 arranged in axial direction and multiple radially extending disks (friction members) 32 arranged in axial direction (multiple illustration is omitted in the drawing). The plates 31 and disks 32 are alternately arranged in axial direction. In other words, the brake mechanism 30 includes plates 31 and disks 32 as a plurality of friction engagement elements.

The multiple plates 31 are circumferentially non-rotatably and axially movably engaged at their radial outer ends with the inner peripheral surface of the surrounding wall of the case 7. The multiple disks 32 rotate integrally with the outer drum 25 owing to their radially inner ends being engaged with outer peripheral surface of the outer drum 25 to be circumferentially non-rotatable and axially movable relative to the outer drum 25. A non-contact rotational speed sensor 35 for detecting rotational speed of the outer drum 25 is provided on inner peripheral surface of the case 7 to face outer peripheral surface of the outer drum 25 axially sideward of the brake mechanism 30.

The brake mechanism 30 includes a spring (not shown) for applying biasing force acting to separate the plates 31 and disks 32 and thus release the disks 32 from the plates 31, and a piston (not shown) for applying pushing force acting against the biasing force of the spring to engage the plates 31 and disks 32. The piston is driven by hydraulic pressure supplied through a hydraulic pressure control unit 8. In a state with no hydraulic pressure acting on the piston, the plates 31 and disks 32 separate, thereby releasing (turning OFF) the brake mechanism 30 and allowing rotation of the second ring gear 22. On the other hand, when hydraulic pressure acts on the piston, the plates 31 and disks 32 engage, thereby operating (turning ON) the brake mechanism 30. In this state, rotation of the second ring gear 22 is prevented.

An axis CL1-centered substantially cylindrical inner drum 26 is provided radially inward of and facing the outer drum 25. The second sun gear 21 is connected to a output shaft 27 of a second planetary gear mechanism 20 that extends along axis CL1 and is connected to the inner drum 26, whereby the second sun gear 21, output shaft 27 and inner drum 26 rotate integrally. A clutch mechanism 40 is provided between the outer drum 25 and the inner drum 26.

The clutch mechanism 40 is, for example, structured as a multi-plate wet clutch including multiple radially extending plates (friction members) 41 arranged in axial direction and multiple radially extending disks (friction members) 42 arranged in axial direction (multiple illustration is omitted in the drawing). The plates 41 and disks 42 are alternately arranged in axial direction. In other words, the clutch mechanism 40 includes plates 41 and disks 42 as a plurality of friction engagement elements.

The multiple plates 41 rotate integrally with the outer drum 25 owing to their radial outer ends being engaged with the inner peripheral surface of the outer drum 25 to be circumferentially non-rotatable and axially movable relative to the outer drum 25. The multiple disks 42 rotate integrally with the inner drum 26 owing to their radially inner ends being engaged with outer peripheral surface of the inner drum 26 to be circumferentially non-rotatable and axially movable relative to the inner drum 26.

The clutch mechanism 40 includes a spring (not shown) for applying biasing force acting to separate the plates 41 and disks 42 and thus release the disks 42 from the plates 41, and a piston (not shown) for applying pushing force acting against the biasing force of the spring to engage the plates 41 and disks 42. The piston is driven by hydraulic pressure supplied through the hydraulic pressure control unit 8.

In a state with no hydraulic pressure acting on the piston, the plates 41 and disks 42 separate, thereby releasing (turning OFF) the clutch mechanism 40 and allowing relative rotation of the second sun gear 21 with respect to the second ring gear 22. When rotation of the second ring gear 22 is prevented by the brake mechanism 30 being ON at this time, rotation of the output shaft 27 with respect to the second carrier 24 is accelerated. This state corresponds to speed ratio stage (speed range) being shifted to high (high-speed range).

On the other hand, when hydraulic pressure acts on the piston, the plates 41 and disks 42 engage, thereby operating (turning ON) the clutch mechanism 40 and integrally joining the second sun gear 21 and second ring gear 22. When rotation of the second ring gear 22 is allowed by the brake mechanism 30 being OFF at this time, the output shaft 27 becomes integral with the second carrier 24 and rotates at the same speed as the second carrier 24. This state corresponds to speed ratio stage (speed stage) being shifted to low (low-speed stage).

The second planetary gear mechanism 20, brake mechanism 30 and clutch mechanism 40 configure a speed change mechanism 70 that shifts rotation of the second carrier 24 between two speed stages (high and low) and outputs the shifted rotation from the output shaft 27.

The output shaft 27 is connected through a one-way clutch 50 to an output gear 51 centered on axis CL1. The one-way clutch 50 allows forward rotation of the output gear 51 with respect to the output shaft 27, i.e., relative rotation corresponding to vehicle forward direction, and prohibits rotation corresponding to vehicle reverse direction. In other words, when rotational speed of the output shaft 27 corresponding to vehicle forward direction is faster than rotational speed of the output gear 51, the one-way clutch 50 locks, whereby the output shaft 27 and output gear 51 rotate integrally. On the other hand, when rotational speed of the output gear 51 corresponding to vehicle forward direction is faster than rotational speed of the output shaft 27, the one-way clutch 50 disengages (unlocks), whereby the output gear 51 freely rotates with respect to the output shaft 27 without torque pulled back.

A rotating shaft 3a of the rotor of the second motor-generator 3 is connected to the output gear 51, so that the output gear 51 and the second motor-generator 3 (rotating shaft 3a) rotate integrally. Since the one-way clutch 50 is interposed between the output shaft 27 and the rotating shaft 3a, forward relative rotation of the rotating shaft 3a with respect to the output shaft 27 is allowed. In other words, when rotational speed of the second motor-generator 3 is faster than rotational speed of the output shaft 27, the second motor-generator 3 efficiently rotates without torque of the output shaft 27 (second planetary gear mechanism 20) pulled back. The one-way clutch 50 is installed radially inward of the rotating shaft 3a. Since axial length of the drive system 100 can therefore be minimized, a smaller drive system 100 can be realized.

A mechanical oil pump (MOP) 60 is installed radially inward of the rotor of the second motor-generator 3. The mechanical oil pump 60 is connected to the output shaft 1a of the engine 1 and driven by the engine 1. Oil supply necessary when the engine 1 is stopped is covered by driving an electric oil pump (EOP) 61 with power from the battery 6.

A large-diameter gear 53 rotatable around a counter shaft 52 lying parallel to axis CL1 meshes with the output gear 51, and torque is transmitted to the counter shaft 52 through the large-diameter gear 53. Torque transmitted to the counter shaft 52 is transmitted through a small-diameter gear 54 to a ring gear 56 of a differential unit 55 and further transmitted through the differential unit 55 to the left and right axles (drive shaft) 57. Since this drives the front wheels 101, the vehicle travels. The rotating shaft 3a, output gear 51, large-diameter gear 53, small-diameter gear 54 and differential unit 55, inter alia, configure a power transmission path 71.

The hydraulic pressure control unit 8 includes electromagnetic valve, proportional electromagnetic valve, and other control valves actuated in accordance with electric signals. These control valves operate to control hydraulic pressure flow to the brake mechanism 30, clutch mechanism 40 and the like in accordance with instructions from the controller 4. This enables ON-OFF switching of the brake mechanism 30 and clutch mechanism 40.

The controller (ECU) 4 as an electric control unit incorporates an arithmetic processing unit having a CPU, ROM, RAM and other peripheral circuits, and the CPU includes an engine control ECU 4a, a speed change mechanism control ECU 4b and a motor-generator control ECU 4c. Alternatively, the multiple ECUs 4a to 4c need not be incorporated in the single controller 4 but can instead be provided as multiple discrete controllers 4 corresponding to the ECUs 4a to 4c.

The controller 4 receives as input signals from, inter alia, the rotational speed sensor 35 for detecting rotational speed of the outer drum 25, a vehicle speed sensor 36 for detecting vehicle speed, and an accelerator opening angle sensor 37 for detecting accelerator opening angle indicative of amount of accelerator pedal depression. Although not indicated in the drawings, the controller 4 also receives signals from a sensor for detecting rotational speed of the engine 1, a sensor for detecting rotational speed of the first motor-generator 2 and a sensor for detecting rotational speed of the second motor-generator 3.

The controller 4 includes a mode instruction unit for deciding and instructing a drive mode in accordance with a predefined driving force map representing vehicle driving force characteristics defined in terms of factors such as vehicle speed and accelerator opening angle, based on input signals from these sensors. In order to enable the vehicle to travel in the drive mode instructed from the mode instruction unit, the controller 4 controls operation of the engine 1, first and second motor-generators 2 and 3, the brake mechanism 30 and the clutch mechanism 40 by outputting control signals to, inter alia, an actuator for regulating throttle valve opening, an injector for injecting fuel, the power control unit 5 and the hydraulic pressure control unit 8.

Figures 2, 3:
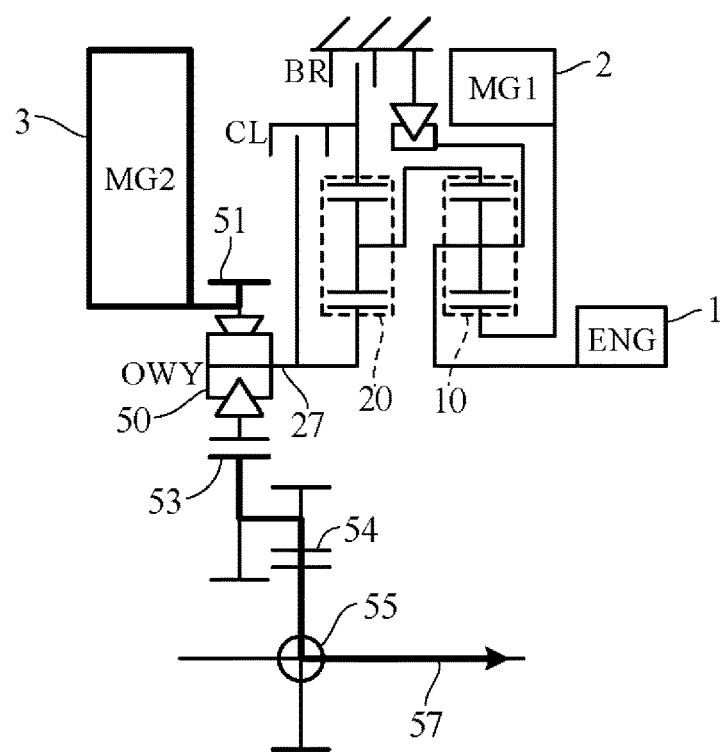
FIG. 2 is a diagram an example of drive modes implemented by the drive system of the hybrid vehicle according to the embodiment of the invention.
FIG. 3 is a skeleton diagram showing a flow of torque transmission in EV mode in the drive system of FIG. 1.

FIG. 2 is a table showing examples of some drive modes that can be implemented by the vehicle drive system 100 according to this embodiment of the present invention, along with operating states of the brake mechanism (BR) 30, clutch mechanism (CL) 40, one-way clutch (OWY) 50 and engine (ENG) 1 corresponding to the different modes.

In FIG. 2, EV mode, W motor mode (double motor mode), series mode and HV mode are shown as typical drive modes. HV mode is subdivided into low mode (HV low mode) and high mode (HV high mode). In the drawing, brake mechanism 30 ON (Engaged), clutch mechanism 40 ON (Engaged), one-way clutch 50 Locked, and engine 1 Operating are indicated by symbol "○", while brake mechanism 30 OFF (Disengaged), clutch mechanism 40 OFF (Disengaged), one-way clutch 50 Unlocked, and engine 1 Stopped are indicated by symbol "x".

In EV mode, the vehicle is driven for traveling solely by motive power of the second motor-generator 3. As shown in FIG. 2, in EV mode, the brake mechanism 30 and clutch mechanism 40 are both OFF, and the engine 1 is stopped, in accordance with instructions from the controller 4. FIG. 3 is a skeleton diagram showing flow of torque transmission in EV mode.

As show in FIG. 3, in EV mode, torque output from the second motor-generator 3 is transmitted through the output gear 51, large-diameter gear 53, small-diameter gear 54 and differential unit 55 to the axles 57. At this time, the output shaft 27 stays stopped under action of the one-way clutch 50 and efficient vehicle running can be achieved without torque pulled back (rotational resistance) attributable to rotating elements upstream of the second motor-generator 3 (on second planetary gear mechanism side).

Figure 4:
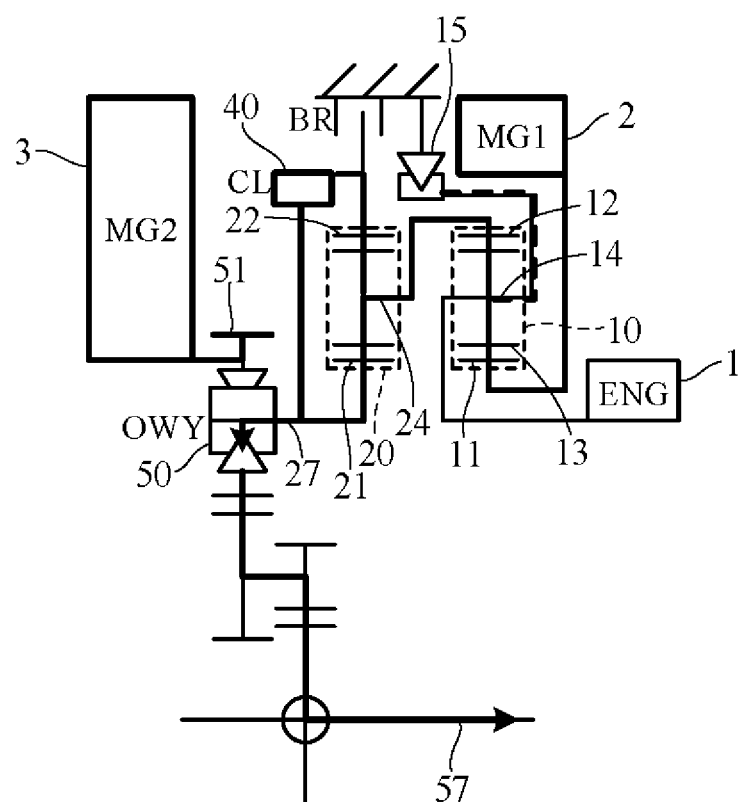
FIG. 4 is a skeleton diagram showing a flow of torque transmission in W motor mode in the drive system of FIG. 1.

In W motor mode, the vehicle is driven for traveling by motive power of the first motor-generator 2 and the second motor-generator 3. As shown in FIG. 2, in W motor mode, the brake mechanism 30 is OFF, the clutch mechanism 40 is ON and the engine 1 is stopped, in accordance with instructions from the controller 4. FIG. 4 is a skeleton diagram showing flow of torque transmission in W motor mode.

As show in FIG. 4, in W motor mode, rotation of the first carrier 14 is prevented by action of the one-way clutch 15, and torque output from the first motor-generator 2 is transmitted through the first sun gear 11, first pinions 13, first ring gear 12, second carrier 24 (second carrier 24 rotating integrally with the second sun gear 21 and second ring gear 22) to the output shaft 27. Torque transmitted to the output shaft 27 is transmitted through the locked one-way clutch 50 to the output gear 51, and transmitted to the axles 57 together with torque output from the second motor-generator 3. Since torque from the first motor-generator 2 and second motor-generator 3 is applied to the axles 57 in this manner in W motor mode (double motor mode), driving force can be increased to greater than in EV mode.

Figure 5:
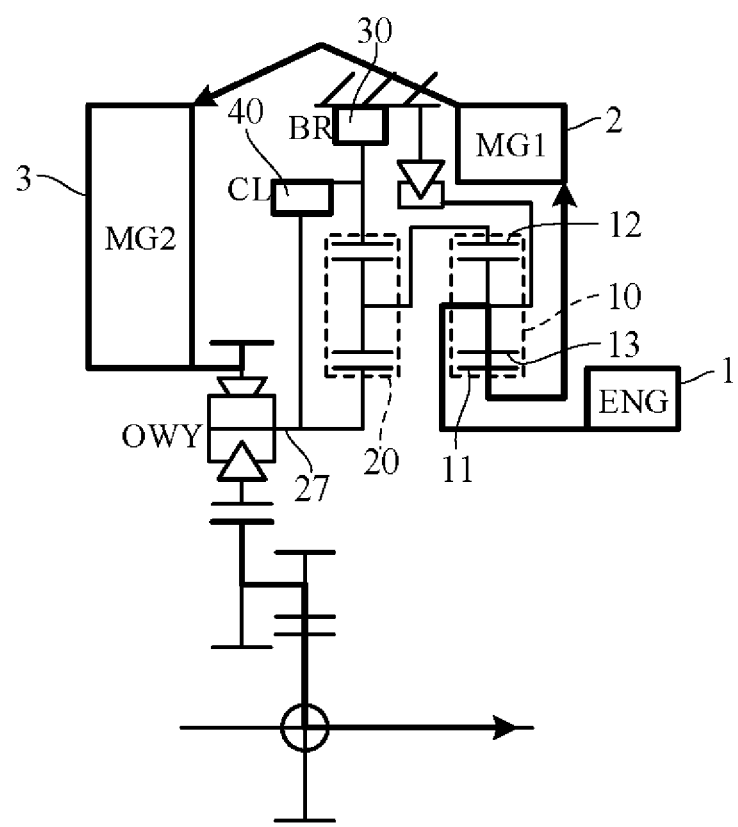
FIG. 5 is a skeleton diagram showing a flow of torque transmission in series mode in the drive system of FIG. 1.

In series mode, the vehicle is driven for traveling by motive power of the second motor-generator 3 while the first motor-generator 2 is being driven by motive power from the engine 1 to generate electric power. As shown in FIG. 2, in series mode, the brake mechanism 30 and clutch mechanism 40 are both ON and the engine 1 is operated, in accordance with instructions from the controller 4. FIG. 5 is a skeleton diagram showing flow of torque transmission in series mode.

As shown in FIG. 5, in series mode, rotation from the first ring gear 12 to as far as the output shaft 27 is stopped, so that all power output from the engine 1 is input through the first pinions 13 and first sun gear 11 to the rotor rotating shaft 2a of the first motor-generator 2. The first motor-generator 2 is therefore driven to generate electric power and this generated electric power is used to drive the second motor-generator 3, whereby the vehicle can travel. In other words, an electrical path is structured for supplying electrical energy generated by the first motor-generator 2 to the second motor-generator 3, whereby running of the vehicle is driven by the second motor-generator 3. In series mode, as in EV mode, pull back of torque is prevented by action of the one-way clutch 50.

In HV mode, the vehicle is driven for traveling by motive power produced by the engine 1 and power of the first motor-generator 2 or the second motor-generator 3. Within the HV mode, the HV low mode corresponds to a mode of wide-open acceleration from low speed, and the HV high mode corresponds to a mode of normal traveling after EV traveling. As shown in FIG. 2, in HV low mode, the brake mechanism 30 is OFF, the clutch mechanism 40 is ON and the engine 1 is operated, in accordance with instructions from the controller 4. In HV high mode, the brake mechanism 30 is ON, the clutch mechanism 40 is OFF and the engine 1 is operated, in accordance with instructions from the controller 4.

Figure 6:
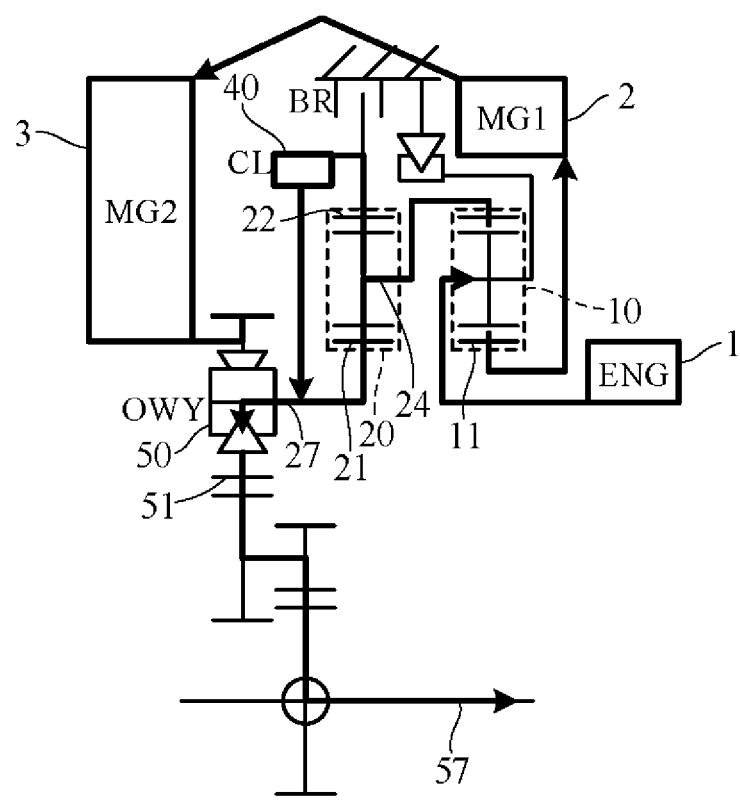
FIG. 6 is a skeleton diagram showing a flow of torque transmission in first HV low mode in the drive system of FIG. 1.
Figure 7:
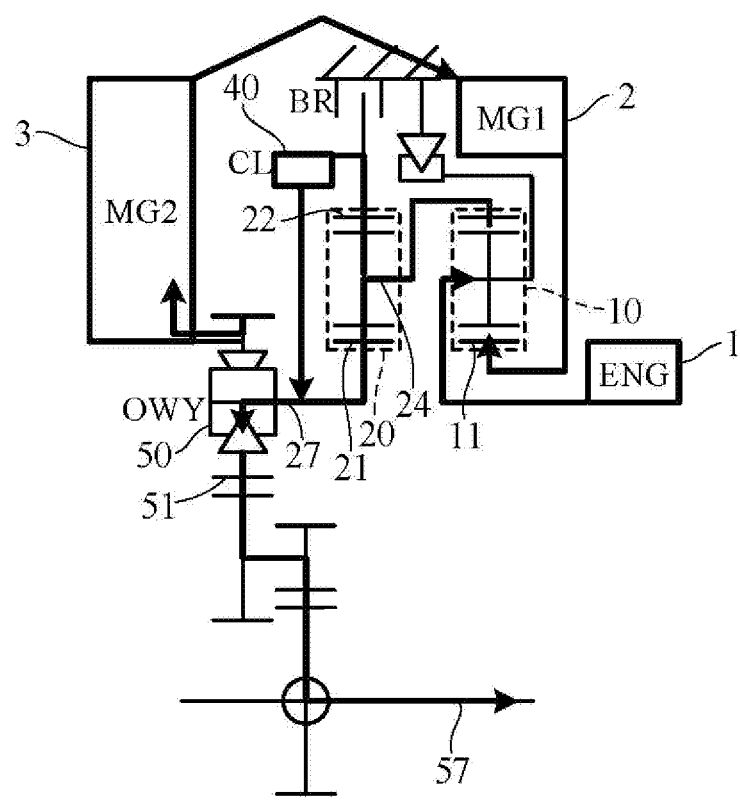
FIG. 7 is a skeleton diagram showing a flow of torque transmission in second HV low mode in the drive system of FIG. 1.

FIGS. 6 and 7 are skeleton diagrams showing flow of torque transmission in HV low mode. More specifically, FIG. 6 is a skeleton diagram mainly corresponding to low-speed travel or medium-speed travel in HV low mode, and FIG. 7 is a skeleton diagram mainly corresponding to high-speed travel in HV low mode. Torque transmission paths shown in FIGS. 6 and 7 are different from each other. The modes corresponding to FIGS. 6 and 7 are sometimes called a first HV low mode and a second HV low mode, respectively.

As shown in FIG. 6, in first HV low mode, some torque output from the engine 1 is transmitted through the first sun gear 11 to the first motor-generator 2. As a result, the first motor-generator 2 generates electric power, and driving electric power is supplied through the power control unit 5 to the second motor-generator 3. At this time, the power control unit 5 may control flow of electric power so as to charge the battery 6. On the other hand, remainder of torque output from the engine 1 is transmitted through the first ring gear 12 and the second carrier 24 (second carrier 24 rotating integrally with the second sun gear 21 and second ring gear 22) to the output shaft 27. Rotational speed of the output shaft 27 at this time is equal to rotational speed of the second carrier 24. Torque transmitted to the output shaft 27 is transmitted through the locked one-way clutch 50 to the output gear 51, and transmitted to the axles 57 together with torque output from the second motor-generator 3. This enables high-torque vehicle running using torque from the engine 1 and second motor-generator 3, while maintaining sufficient battery residual charge with power generated by the first motor-generator 2.

As shown in FIG. 7, in second HV low mode, the first motor-generator 2 functions as a motor, and torque output from the engine 1 and the first motor generator 2 is transmitted to the axles 57 through the first ring gear 12, second carrier 24, one-way clutch 50 and output gear 51. In this case, torque from the axles 57 is input to the second motor-generator 3, the second motor-generator 3 generates electric power, and driving electric power is supplied through the power control unit 5 to the first motor-generator 2. At this time, the power control unit 5 may control flow of electric power so as to charge the battery 6. This enables high-torque vehicle running using torque from the engine 1 and first motor-generator 2, while maintaining sufficient battery residual charge with power generated by the second motor-generator 3.

Figure 8:
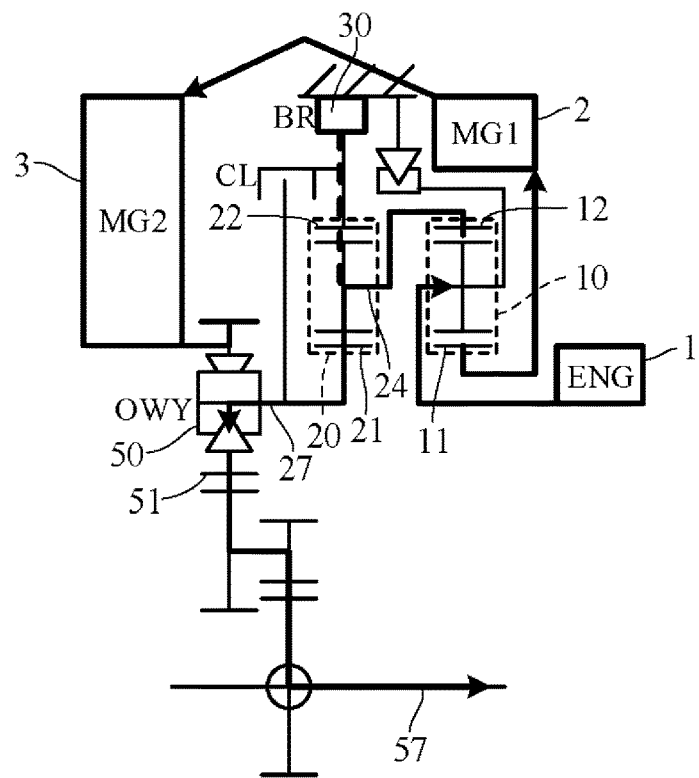
FIG. 8 is a skeleton diagram showing a flow of torque transmission in HV high mode in the drive system of FIG. 1.

FIG. 8 is a skeleton diagram showing flow of torque transmission in HV high mode. As shown in FIG. 7, in HV high mode, similarly to in first HV low mode, some torque output from the engine 1, for example, is transmitted through the first sun gear 11 to the first motor-generator 2. Remainder of torque output from the engine 1 is transmitted through the first ring gear 12, second carrier 24 and second sun gear 21 to the output shaft 27. Rotational speed of the output shaft 27 at this time is greater than rotational speed of the second carrier 24.

Torque transmitted to the output shaft 27 is transmitted through the locked one-way clutch 50 to the output gear 51, and transmitted to the axles 57 together with torque output from the second motor-generator 3. Therefore, by utilizing torque from the engine 1 and second motor-generator 3 while maintaining sufficient battery residual charge, vehicle running can be achieved at torque that, while lower than that in HV low mode, is higher than that in EV mode. Since rotation of the output shaft 27 is speeded up by the second planetary gear mechanism 20 in HV high mode, running at lower engine speed than in HV low mode can be realized. Therefore, travel in HV high mode can improve fuel efficiency and suppress noise than travel in HV low mode.

Figure 9:
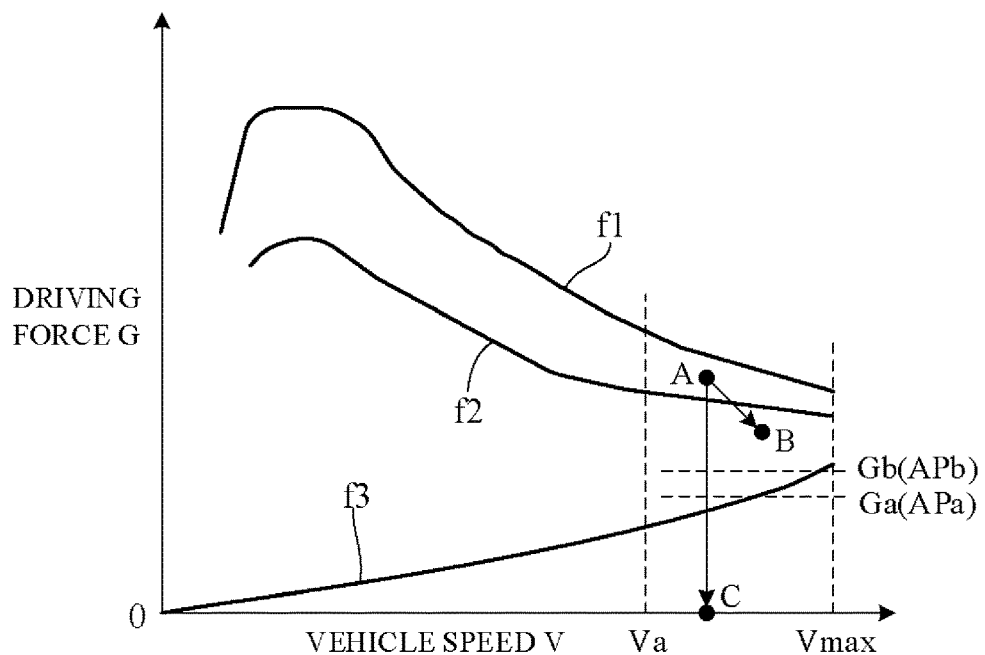
FIG. 9 is a diagram related to the drive system of the present embodiment showing relationship of driving force relative to vehicle speed in HV low mode and HV high mode when accelerator pedal is floored.

FIG. 9 is a diagram related to the drive system 100 of the present embodiment showing relationship of driving force G relative to vehicle speed V in HV low mode and HV high mode when accelerator pedal is floored. In FIG. 9, f1 is a characteristic curve in HV low mode, f2 is a characteristic curve in HV high mode, and f3 is a characteristic curve showing travel resistance. As shown in FIG. 9, the drive system 100 of the present embodiment can output driving force G beyond travel resistance from low-speed range (for example, vehicle speed=0) over maximum speed Vmax in both modes of HV low mode and HV high mode. Therefore, the vehicle can travel in entire area of vehicle speed in both modes of HV low mode and HV high mode.

In particular, in FIG. 9, characteristic curve f1 exceeds characteristic curve f2 in entire area of vehicle speed. Therefore, in HV low mode, it is possible to obtain greater driving force G than that in HV high mode. In addition, in the present embodiment, the drive system 100 is configured so that a ratio of speed ratio of low-speed range relative to speed ratio of high-speed range, i.e., step ratio is great. Therefore, in HV high mode, it is possible to improve fuel efficiency and quietness than in HV low mode.

In the so-configured drive system 100, when the speed change mechanism 70 shifts to a high-speed ratio (high-speed range) in response to an upshift instruction during vehicle traveling in HV low mode, the clutch mechanism 40 disengages and the brake mechanism 30 engages. Since rotation of the disks 32 of the brake mechanism 30 is stopped at this time, the brake mechanism 30 generates heat due to friction between the plates 31 and disks 32. Amount of heat generated is greater in proportion as difference of rotational speed between the plates 31 and disks 32 is greater and is maximum in case of shifting from HV low mode (second HV low mode) to HV high mode during high-speed traveling. An attempt to strengthen the brake mechanism 30 of this type against heat generation by improving its heat resistance is likely to increase cost and enlarge size of the drive system 100. In order to deal with this issue, the drive system 100 according to the present invention is configured as set out in the following.

Figure 10A:
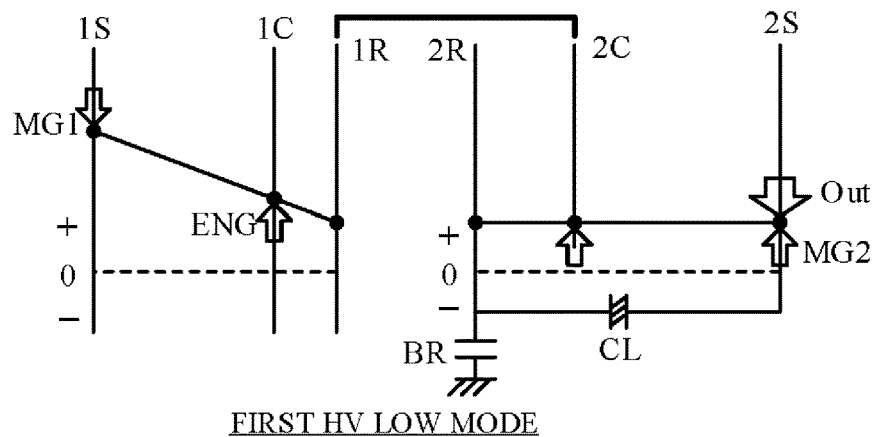
FIG. 10A is an alignment chart showing an example of operation in first HV low mode.
Figure 10B:
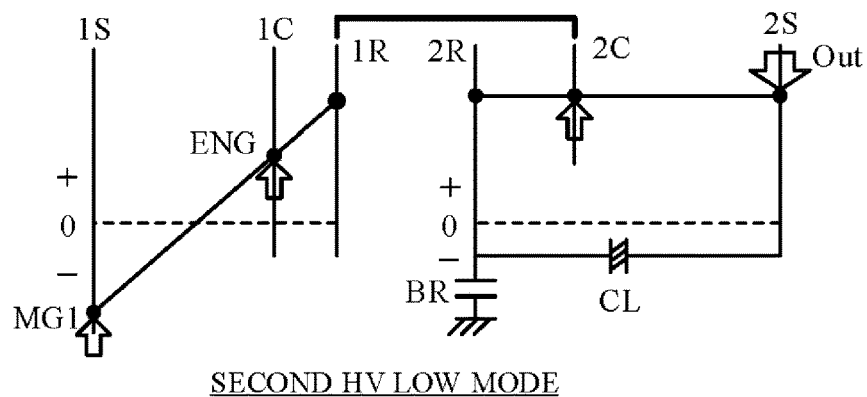
FIG. 10B is an alignment chart showing an example of operation in second HV low mode.
Figure 10C:
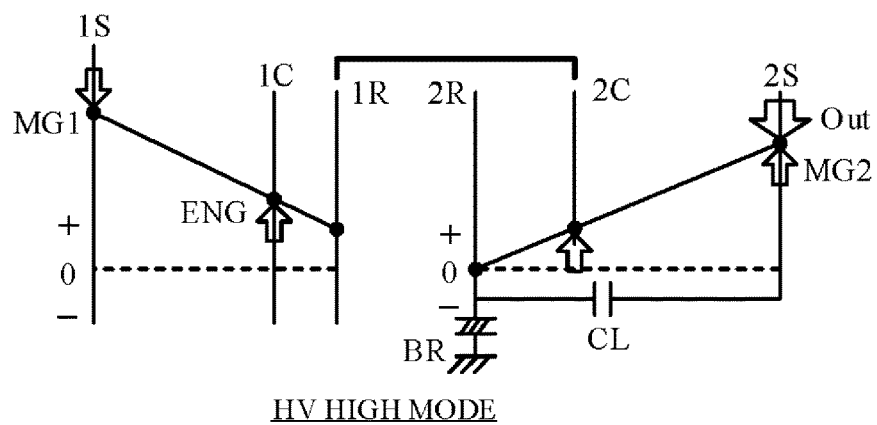
FIG. 10C is an alignment chart showing an example of operation in HV high mode.

The present embodiment is characterized by speed change operation from HV low mode to HV high mode in accordance with instruction from the controller 4. FIGS. 10A, 10B and 10C are diagrams each showing an example of an alignment chart in first HV low mode, second HV low mode and HV high mode. In the drawings, the first sun gear 11, first carrier 14 and first ring gear 12 are designated 1S, 1C and 1R, respectively, and the second sun gear 21, second carrier 24 and second ring gear 22 are designated 2S, 2C and 2R, respectively. Rotation direction of the first ring gear 12 and second carrier 24 during forward vehicle movement is defined as positive direction. Forward direction is indicated by symbol "+" and torque acting in forward direction is indicated by upward pointing arrow.

As shown in FIG. 10A, in first HV low mode, the brake mechanism 30 (BR) is turned OFF and the clutch mechanism 40 (CL) is turned ON by operation of the hydraulic pressure control unit 8 in accordance with instruction from the controller 4. Therefore, the first carrier 14 (1C) is rotated in positive direction by the engine 1 and the first motor-generator 2 (MG1) starts to generate electricity, and the first ring gear 12 (1R) rotates in positive direction and the second carrier (2C) also rotates in positive direction. In this case, since the second carrier 24 (2C), second sun gear 21 (2S) and second ring gear 22 (2R) are integrally configured, the second sun gear 21 (2S) rotates at same speed as the second carrier 24 (2C). The vehicle is traveled by this torque from the second sun gear 21 and torque of the second motor-generator 3 (MG2).

As shown in FIG. 10B, in second HV low mode, the second motor-generator 3 generates electricity, and the first motor-generator 2 (MG1) rotates in negative direction by electric power supplied through the power control unit 5. Therefore, rotational speed of the first ring gear 12 (1R) increases and the first ring gear 12 rotates at high speed. As a result, by using torque from the first motor generator 2 and engine 1 (ENG), the vehicle can travel at higher vehicle speed than vehicle speed in first HV low mode.

As shown in FIG. 10C, in HV high mode, the brake mechanism 30 (BR) is turned ON and the clutch mechanism 40 (CL) is turned OFF by operation of the hydraulic pressure control unit 8 in accordance with instruction from the controller 4. Therefore, the first carrier 14 (1C) is rotated in positive direction by the engine 1 and the first motor-generator 2 (MG1) starts to generate electricity, and the first ring gear 12 (1R) rotates in positive direction. In this case, since the second ring gear 22 (2R) is stopped, the second sun gear 21 (2S) rotates at speed higher than the second carrier 24 (2C). The vehicle is traveled by this torque from the second sun gear 21 and torque of the second motor-generator 3 (MG2).

Figure 11:
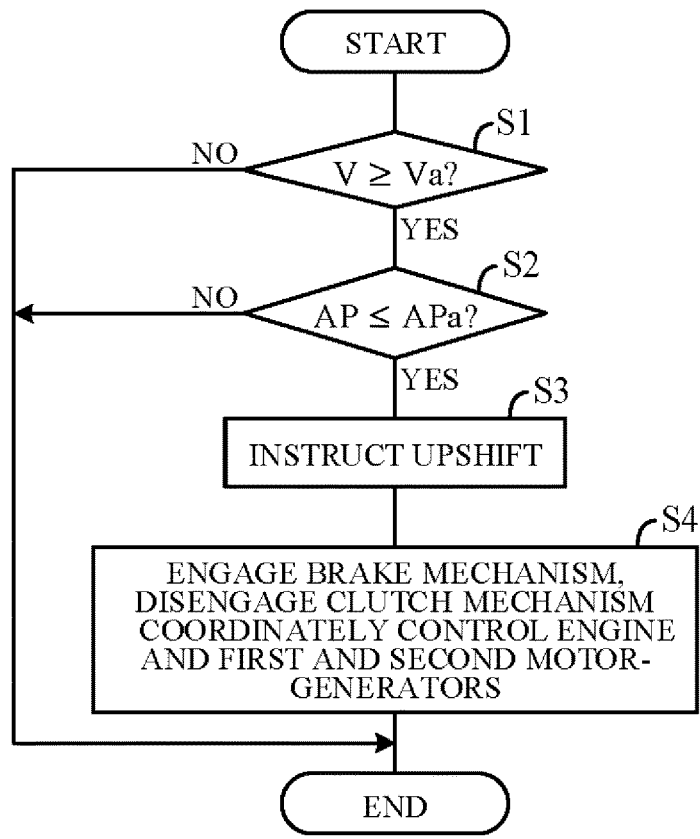
FIG. 11 is a flowchart showing an example of a processing performed by a controller of FIG. 1.

FIG. 11 is a flowchart showing an example of processing performed by the controller 4 in accordance with a program stored in memory. The processing of this flowchart is repeatedly performed periodically at predetermined intervals in correspondence with processing related to upshifting the speed change mechanism 70 and continued so long as drive mode continues to be HV low mode (second HV low mode), for example. Then when upshift is completed upon transitioning of drive mode to HV high mode, the processing terminates.

First, in S1 (S: processing Step), whether vehicle speed V detected by the vehicle speed sensor 36 is equal to or greater than predetermined vehicle speed Va is determined. This is for determining, for example, whether the vehicle is traveling in second HV low mode (FIG. 10B) and negative rotational speed of the first motor-generator 2 (rotational speed during driving as a motor) is equal to or greater than predetermined value. An example of predetermined vehicle speed Va is shown in FIG. 9. Optionally, predetermined speed Va can be a variable value. If a positive decision is made in S1, the routine proceeds to S2, and if a negative decision is made, the processing is terminated.

In S2, whether accelerator opening angle AP detected by the accelerator opening angle sensor 37 is equal to or less than predetermined value APa is determined. This is for determining, for example, whether vehicle deceleration has been instructed or whether termination of acceleration has been instructed after instruction of acceleration. Accelerator opening angle AP corresponds to required driving force. An example of driving force Ga corresponding to predetermined value APa is shown in FIG. 9. Optionally, predetermined value APa can be a value that varies with vehicle speed V. For example, predetermined value APa can be increased with increasing vehicle speed V.

FIG. 9 also shows an example of driving force Gb as downshift condition for downshifting the speed change mechanism 70. Specifically, in HV high mode, the speed change mechanism 70 is downshifted when driving force (required driving force) G becomes predetermined value Gb or greater. Predetermined accelerator opening angle APb is correlated with predetermined value Gb. Predetermined value Gb is, for example, set to larger value than driving force Ga set as upshift condition. Alternatively, Gb can be equal to Ga or can be a value that varies with vehicle speed V. Therefore, relationship between APa and APb is, for example, APa≤APb.

If a positive decision is made in S2, the routine proceeds to S3, and if a negative decision is made, the processing is terminated. In S3, upshift is instructed. Next, in S4, upshift of the speed change mechanism 70 is performed in accordance with the upshift instruction. Specifically, a control signal is output to the control valve of the hydraulic pressure control unit 8 to control piston-driving hydraulic force (clutch pressure) of the brake mechanism 30 and clutch mechanism 40 so as to increase clutch torque of the brake mechanism 30 and decrease clutch torque of the clutch mechanism 40. In other words, the brake mechanism 30 is engaged and the clutch mechanism 40 is disengaged.

Additionally in S4, the engine 1, first motor-generator 2 and second motor-generator 3 are coordinately controlled based on signals from, inter alia, the rotational speed sensor 35. Specifically, change in rotational speed of the outer drum 25 of the clutch mechanism 40 in shift transient state is detected by the rotational speed sensor 35, and the engine 1, first motor-generator 2 and second motor-generator 3 are coordinately controlled based on the detected value. More specifically, driving torque of the first motor-generator 2 is controlled to 0, whereafter absorption torque of the first motor-generator 2 is increased to generate electric power by the first motor-generator 2. Further, absorption torque of the second motor-generator 3 is controlled to 0, whereafter driving torque of the second motor-generator 3 is increased to generate vehicle driving force by the second motor-generator 3.

A detailed explanation of an example of operation of the hybrid vehicle drive system 100 according to the present embodiment follows. As indicated by operating point A of FIG. 9, when vehicle speed V is predetermined speed Va or greater and driving force G is equal to or greater than predetermined value Gb, drive mode assumes second HV low mode. When operating point moves from this state to B in response to an acceleration instruction by operation of the accelerator pedal, accelerator opening angle AP is greater than predetermined value APa because driving force G is greater than predetermined value Ga. Upshift of the speed change mechanism 70 is therefore not performed and second HV low mode is maintained. On the other hand, when driving force G becomes 0 during second HV low mode traveling (operating point C) owing to non-operation of the accelerator pedal, for example, upshift is instructed because accelerator opening angle AP is predetermined value APa or less (S3).

So during vehicle high-speed traveling (V≥Va), upshift is not instructed in response to an acceleration instruction (driving force G≥Ga) and upshift is instructed in response to a deceleration or acceleration termination instruction due to non-operation of the accelerator pedal, for example. Thus when acceleration is instructed, the speed change mechanism 70 stays in low-speed range and the vehicle can therefore accelerate smoothly without any gear-shift action.

Figure 12:
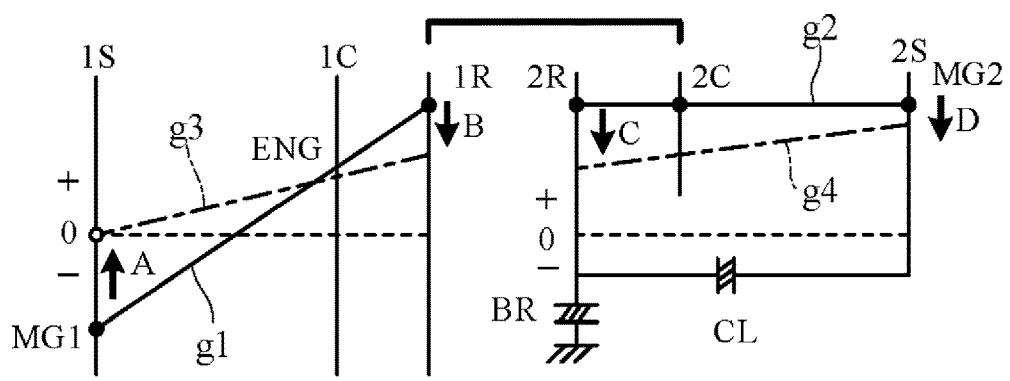
FIG. 12 is an alignment chart showing an example of an action in a course of switching from second HV low mode to HV high mode.

When upshift is instructed during traveling in second HV low mode, the engine 1, first motor-generator 2 and second motor-generator 3 are coordinately controlled (S4). The coordinate control is performed by, for example, first controlling the first motor-generator 2 and then subordinately controlling the second motor-generator 3 in accordance with action resulting from the control of the first motor-generator 2. FIG. 12 shows an alignment chart illustrating an example of behavior in this case. Characteristic curves g1 and g2 (solid lines) in the FIG. 12 represent characteristics in second HV low mode, i.e., same mode as shown in FIG. 10B, and characteristic curves g3 and g4 (one-dot-dashed lines) represent characteristics during transition to HV high mode.

As shown in FIG. 12, in the course of transitioning from second HV low mode to HV high mode, rotational speed of the first motor-generator 2 (1S) increases toward positive side (decreases in negative rotational speed) as indicated by arrow A, to become 0. As a result, reaction force of the first motor-generator 2 acting on the first ring gear 12 (1R) increases, rotational speed of the first ring gear 12 decreases as indicated by arrow B, and rotational speed of the second ring gear 22 (2R) concomitantly decreases as indicated by arrow C. Since difference of rotational speed between the plates 31 and disks 32 of the brake mechanism 30 therefore decreases, amount of heat generation during engagement of the brake mechanism 30 can be minimized. At this time, the first motor-generator 2 generates electric power by absorbing its own rotational energy, and the second motor-generator 3 is powered by electric power generated in the first motor-generator 2.

During engagement of the brake mechanism 30, reaction force of the first motor-generator 2 acts on the second sun gear 21 (2S) toward pull back side (negative side) as indicated by arrow D in FIG. 12. In the present embodiment, however, the one-way clutch 50 is provided between the second motor-generator 3 and the second sun gear 21 (output shaft 27) (FIG. 1), so that when the one-way clutch 50 assumes unlocked state, the second sun gear 21 is rotatable relative to the rotating shaft 3a of the second motor-generator 3. Generation of negative acceleration owing to pull back of torque of rotating elements upstream of the one-way clutch 50 is therefore prevented, thereby enabling rapid, highly responsive shifting of the speed change mechanism 70 and efficient implementation of smooth speed ratio shifting.

Figure 13:
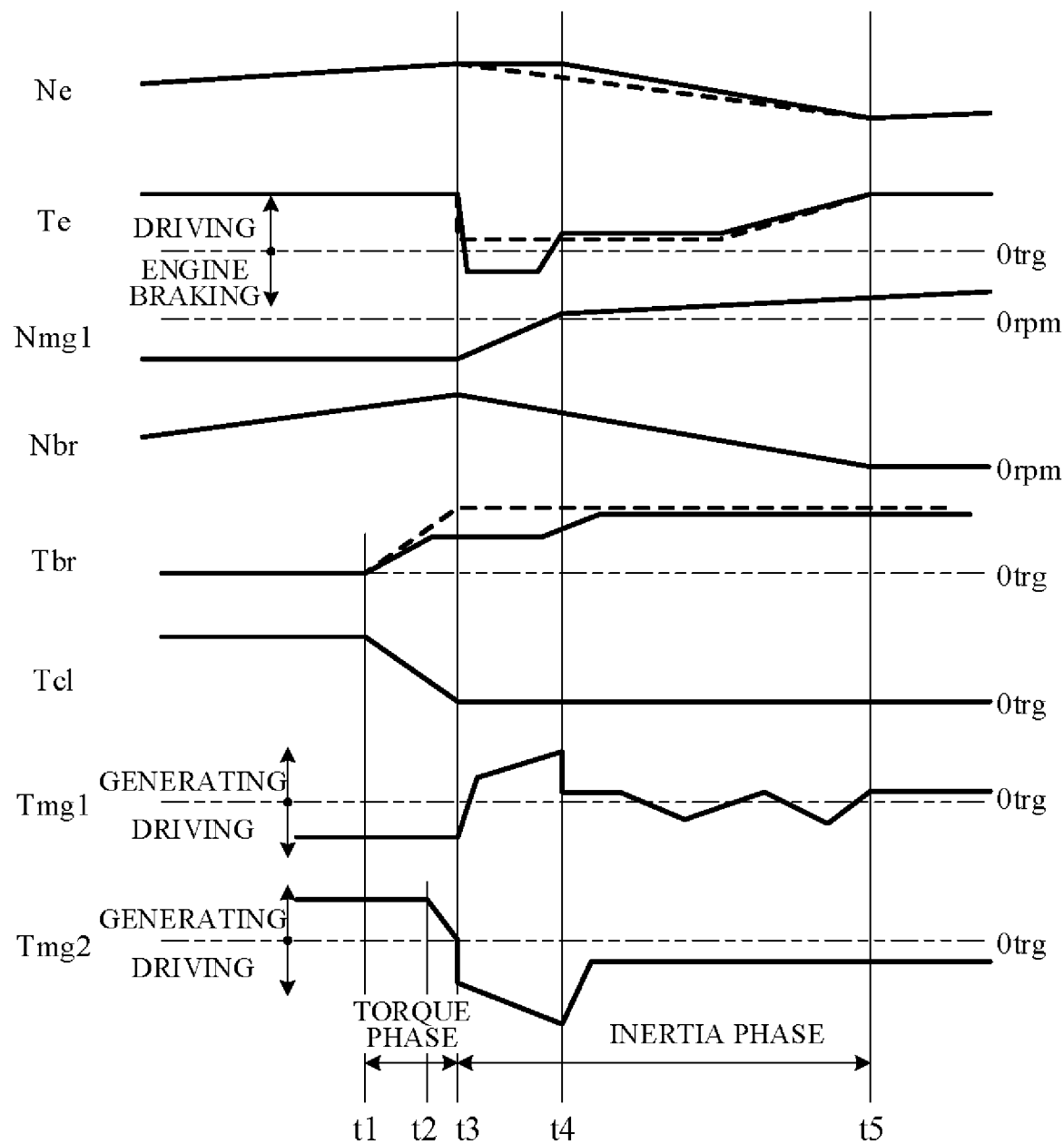
FIG. 13 is a timing chart showing an example of an action of the drive system according to the embodiment of the invention.

FIG. 13 is a time chart showing an example of operation of the drive system 100 according to the present embodiment, particularly an example of operation during switching from second HV low mode to HV high mode. This time chart is a timewise representation of how the controller 4 controls engagement of the brake mechanism 30 and clutch mechanism 40 and coordinately controls the engine 1, first motor-generator 2 and second motor-generator 3 (S4).

The time chart of FIG. 13 shows time course change of engine speed (Ne), engine torque (Te), rotational speed (Nmg1) of first motor-generator 2, rotational speed (Nbr) of second ring gear 22 (of disks 32 of brake mechanism 30), clutch torque (Tbr) of brake mechanism 30, clutch torque (Tcl) of clutch mechanism 40, torque (Tmg1) of first motor-generator 2, and torque (Tmg2) of second motor-generator 3. Solid lines in the drawing represent characteristics of the present embodiment and dashed lines represent characteristics in case of performing generally practiced clutch-to-clutch control (for comparison with the present embodiment).

As shown in FIG. 13, in initial state, the first motor-generator 2 is rotationally driving negatively, while the second motor-generator 3 is generating electric power. When the controller 4 instructs upshift from this state at time t1, in the comparative example, clutch torque Tbr of the brake mechanism 30 gradually increases and clutch torque Tcl of the clutch mechanism 40 gradually decreases in torque phase range from time t1 to time t3. In the present embodiment, on the other hand, rotational speed Nbr of second ring gear 22 decreases at time t3 owing to change of the first motor-generator 2 from driving state to electric power generation state with absorption of inertia by the first motor-generator 2. Since clutch torque Tbr of the brake mechanism 30 therefore decreases in comparison with that in the comparative example, amount of heat generated by the brake mechanism 30 during engagement can be reduced. Optionally, amount of heat generated by the brake mechanism 30 can be reduced without decreasing clutch torque Tbr by shortening time required for engaging the brake mechanism 30 instead of by decreasing clutch torque Tbr of the brake mechanism 30.

In torque phase, vehicle driving force is liable to decrease owing to occurrence of overlapping engagement state in the brake mechanism 30 and clutch mechanism 40. In consideration of this point, electric power generation by the second motor-generator 3 is decreased at time t2 between time t1 and time t3. Since this puts the whole drive system 100 substantially in assist state, loss of vehicle driving force can be minimized. Time t3 to time t5 is range of clutch-to-clutch inertia phase. When the first motor-generator 2 starts to absorb inertia at time t3, the engine 1 is apt to rev. In view of this, the controller 4 of the present embodiment reduces engine torque Te when decrease (start of decrease) of rotational speed Nbr of the second ring gear 22 is detected at time t3 based on a signal from the rotational speed sensor 35. This prevents sudden increase in engine speed Ne. Although FIG. 13 shows that engine braking is induced by lowering engine torque Te to below 0 torque (e.g., to small predetermined value smaller than 0), reduction of engine torque Te is not limited to this degree. Although rotational speed Nmg1 of the first motor-generator 2 is shown to become 0 at time t4 between time t3 and time t5, engine braking is discontinued by no later than this time point t4.

In inertia phase, rotational speed Nbr of the second ring gear 22 falls gradually to reach 0 at time t5 owing to reaction force of the first motor-generator 2 and engagement of the brake mechanism 30. Electric power generated by the first motor-generator 2 and electric power from the battery 6 are supplied to the second motor-generator 3. Since amount of electric power generated by the first motor-generator 2 is proportional to torque Tmg1 and rotational speed Nmg1 of the first motor-generator 2, either torque Tmg1 or power supply from the battery 6 is increased when rotational speed Nmg1 decreases. From time t4 onwards, torque Tmg1 of the first motor-generator 2 varies depending on rotational speed Nbr of the second ring gear 22, engine speed Ne and rotational speed Nmg1 of the second motor-generator 3.

Figure 14:
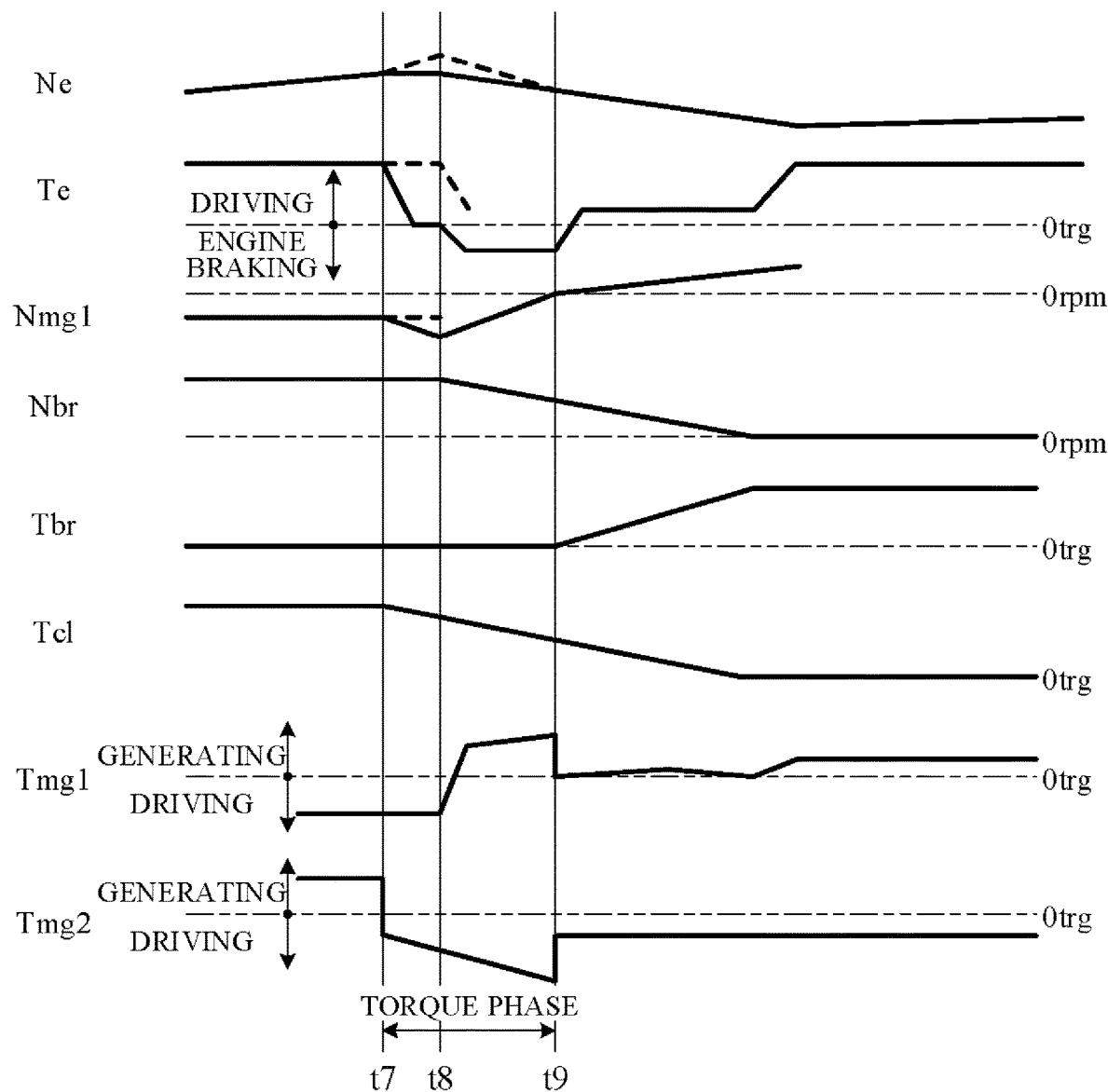
FIG. 14 is a timing chart showing a modification of FIG. 13.

FIG. 14 shows a time chart modified from that of FIG. 13. In the example of FIG. 13, control of, inter alia, the first motor-generator 2 is started in inertia phase. In the modified time chart of FIG. 14, the corresponding control is started in torque phase. Time t7 to time t9 is range of torque phase. From time t9 onward is inertia phase. At time t7 in FIG. 14, engine torque Te and clutch torque Tcl of the clutch mechanism 40 are reduced in advance of increasing clutch torque Tbr of the brake mechanism 30. Moreover, electric power generation by the second motor-generator 3 is lowered in order to minimize decrease of vehicle driving force. In addition, torque Tmg1 of the first motor-generator 2 is maintained as a preparatory measure against revving of the engine 1. As a result, negative direction rotational speed Nmg1 of the first motor-generator 2 increases. At time t8, therefore, absorption energy of the first motor-generator 2 when decrease of rotational speed Nbr of the second ring gear 22 is detected based on a signal from the rotational speed sensor 35, namely, absorption energy when the first motor-generator 2 absorbs inertia, can be increased.

The present embodiment can achieve advantages and effects such as the following:

(1) The drive system 100 of the hybrid vehicle includes: the engine 1; the first motor-generator 2 having the rotor rotating shaft (first motor rotating shaft) 2a; the first planetary gear mechanism 10 that is connected to the output shaft 1a of the engine 1, the rotor rotating shaft 2a and the second carrier 24 of the second planetary gear mechanism 20 and is adapted to divide motive power generated by the engine 1 between the first motor-generator 2 and the second carrier 24 or to transmit motive power generated by the engine 1 and the first motor-generator 2 to the second carrier 24; the speed change mechanism 70 for shifting speed ratio of rotation input from the second carrier 24 and outputting motive power from the output shaft 27; the components (output gear 51 etc.) forming the power transmission path 71 for transmitting motive power output from the output shaft 27 to the axles 57; the second motor-generator 3 having the rotor rotating shaft (second motor rotating shaft) 3a connected to the power transmission path 71; the vehicle speed sensor 36 for detecting vehicle speed V; the accelerator opening angle sensor 37 for detecting accelerator opening angle AP; and the controller 4 responsive to vehicle speed V detected by the vehicle speed sensor 36 and accelerator opening angle AP detected by the accelerator opening angle sensor 37 for controlling the speed change mechanism 70, first motor-generator 2 and second motor-generator 3 (FIG. 1). The speed change mechanism 70 includes the engageable and disengageable brake mechanism 30 and is adapted to shift speed ratio (speed range) to low-speed ratio (low-speed range) or high-speed ratio (high-speed range) when the brake mechanism 30 is disengaged or engaged (FIG. 1). The controller 4 controls the speed change mechanism 70, first motor-generator 2 and second motor-generator 3 to shift speed ratio to low-speed ratio and enable the first motor-generator 2 to function as a motor and the second motor-generator 3 to function as a generator when vehicle speed V detected by the vehicle speed sensor 36 is equal to or greater than predetermined speed Va and accelerator opening angle AP detected by the accelerator opening angle sensor 37 is equal to or greater than predetermined accelerator opening angle APb (FIGS. 10B, 13 and 14). Moreover, when vehicle speed V detected by the vehicle speed sensor 36 is equal to or greater than predetermined speed Va and accelerator opening angle AP detected by the accelerator opening angle sensor 37 is equal to or less than predetermined accelerator opening angle APa, the controller 4 controls the speed change mechanism 70, first motor-generator 2 and second motor-generator 3 to shift speed ratio to high-speed ratio and enable the first motor-generator 2 to function as a generator and the second motor-generator 3 to function as a motor (FIGS. 10C, 11, 13 and 14).

With this configuration, during upshift, rotational speed Nmg1 of the first motor-generator 2 once falls to 0 and rotation of the second ring gear 22 is decelerated by absorbing inertia of the first motor-generator 2. Since difference of rotational speed between the plates 31 and disks 32 of the brake mechanism 30 therefore decreases, amount of heat generated by the brake mechanism 30 during upshift at vehicle speed V of predetermined speed Va or higher is minimized. As this makes required heat resistance of the brake mechanism 30 easy to satisfy, cost and size increase of the drive system 100 can be avoided. Moreover, when accelerating at high vehicle speed, smooth acceleration can be achieved while maintaining low-speed stage with no upshifting because upshift is performed solely on condition of vehicle speed V of predetermined speed Va or greater and accelerator opening angle AP of predetermined value APa or less.

(2) The drive system 100 of the hybrid vehicle includes the one-way clutch 50 incorporated in the power transmission path 71 between the output shaft 27 and the rotating shaft 3a to allow the rotating shaft 3a to rotate relative to the output shaft 27 in one direction and prohibit it from rotating in opposite direction (FIG. 1). Motive power upstream of the one-way clutch 50 can therefore be cut off from the axles 57 during upshift by unlocking of the one-way clutch 50. Since occurrence of negative acceleration owing to pull back of torque can therefore be prevented, smooth speed-shift action can be achieved while also minimizing loss of vehicle traveling force.

(3) The speed change mechanism 70 is additionally equipped with the engageable and disengageable clutch mechanism 40 and is configured so that when the brake mechanism 30 disengages and the clutch mechanism 40 engages, speed ratio shifts to a lower ratio, and when the brake mechanism 30 engages and the clutch mechanism 40 disengages, speed ratio shifts to a higher ratio (FIG. 1). This enables shifting between higher and lower speed ratios with a simple structure.

(4) The first planetary gear mechanism 10 is equipped with the first sun gear 11 connected to the rotor rotating shaft 2a, the first ring gear 12 connected to the second planetary gear mechanism 20, and the first carrier 14 connected to the output shaft 1a of the engine 1 (FIG. 1). The speed change mechanism 70 is equipped with the second planetary gear mechanism 20 including the second sun gear 21 connected to the output shaft 27, the second ring gear 22, and the second carrier 24 connected to the first planetary gear mechanism 10. The brake mechanism 30 is adapted to brake or non-brake rotation of the second ring gear 22, and the clutch mechanism 40 is adapted to integrally join or to separate the second sun gear 21 and the second ring gear 22 (FIG. 1). This enables division of motive power of the engine 1 between the first motor-generator 2 and the output side, and enables the drive system 100 capable of changing speed ratio between high-speed ratio and low-speed ratio to be compactly structured. The aforesaid configuration of the drive system 100 enables ready implementation of various drive modes including, for example, EV mode, HV low mode and HV high mode.

Various modifications of the aforesaid embodiment are possible. Some examples are explained in the following. Although in the aforesaid embodiment, the vehicle speed sensor 36 detects vehicle speed, a vehicle speed detector is not limited to this configuration. Although in the aforesaid embodiment, the accelerator opening angle sensor 37 detects an acceleration instruction and deceleration instruction, an instruction detector for detecting a speed change instruction is not limited to this configuration. Although in the aforesaid embodiment, the speed change mechanism 70 is configured by the second planetary gear mechanism 20, brake mechanism 30 and clutch mechanism 40, a speed change mechanism is not limited to this configuration. Instead of the speed change mechanism 70 including one brake mechanism and one clutch mechanism, a speed change mechanism may be configured to include a pair of brake mechanisms or a pair of clutch mechanisms. In the aforesaid embodiment, the drive system is configured to suppress heat produced by the brake mechanism 30. However, if a clutch mechanism is engaged during upshifting, a drive system is configured to suppress heat produced by the clutch mechanism. The present invention can be applied to a drive system including single friction engagement mechanism instead of a pair of friction engagement mechanisms.

In the aforesaid embodiment, the brake mechanism 30 is configured to engage the plates 31 and disks 32 using pushing force of hydraulic pressure. However, the plates 31 and disks 32 can instead be engaged using spring biasing force and disengaged using hydraulic pressure. Although multi-plate wet type engagement elements are used in the brake mechanism 30 and clutch mechanism 40, band brake, dog or other type of engagement elements can be used instead. In other words, a first engagement mechanism and a second engagement mechanism are not limited to the aforesaid configurations.

Although in the aforesaid embodiment, the second carrier 24 of the second planetary gear mechanism 20 serving as a first rotating shaft is connected to the first ring gear 12 of the first planetary gear mechanism 10 serving as a power division mechanism, the first rotating shaft is not limited to this configuration. Although in the aforesaid embodiment, speed of rotation input from the second carrier 24 is changed by the speed change mechanism 70 and the speed-changed rotation is output from the output shaft 27 serving as a second rotating shaft, the second rotating shaft is not limited to this configuration. Although in the aforesaid embodiment, the one-way clutch 50 is interposed between the output shaft 27 and the rotor rotating shaft 3a, a one-way clutch can be omitted. In the case of omission of the one-way clutch, the drive system can be configured so that negative acceleration owing to pull back of torque during upshifting is not generated.

The configuration of controller 4 serving as an electric control unit is not limited to the aforesaid configuration. In other words, as long as controlling the speed change mechanism 70, the first and second motor-generators 2, 3 so as to switch the speed range to the low-speed range, operate the first motor-generator 2 as a motor and operate the second motor-generator 3 as a generator when vehicle speed is equal to or greater than a predetermined vehicle speed Va and an acceleration instruction is detected and so as to switch the speed range to the high-speed range, operate the first motor-generator 2 as a generator and operate the second motor-generator 3 as a motor when the vehicle speed is equal to or greater than the predetermined vehicle speed Va and a deceleration instruction or a termination instruction of an acceleration is detected, the electric control unit (in particular, microprocessor) is not limited to the aforesaid configuration.

In the aforesaid embodiment, EV mode, W motor mode, series mode, HV low mode (first HV low mode and second HV low mode) and HV high mode are implemented by controlling brake mechanism 30 and clutch mechanism 40 from the controller 4. However, other drive mode can be implemented.

The above embodiment can be combined as desired with one or more of the above modifications. The modifications can also be combined with one another.

According to the present invention, amount of heat produced by a friction engagement mechanism engaged during traveling at high vehicle speed can be suppressed, and thus price increase and upsizing of a drive system can be reduced.

Above, while the present invention has been described with reference to the preferred embodiments thereof, it will be understood, by those skilled in the art, that various changes and modifications may be made thereto without departing from the scope of the appended claims.

What is claimed is:

1. A drive system of a hybrid vehicle, comprising:
    an internal combustion engine;
    a first motor-generator including a first motor rotating shaft;
    a speed change mechanism including a first rotating shaft and a second rotating shaft to transmit a rotation input from the first rotating shaft to the second rotating shaft while changing a speed of the rotation;
    a power division mechanism connected to an output shaft of the internal combustion engine, the first motor rotating shaft and the first rotating shaft, respectively to divide a power generated by the internal combustion engine to the first motor-generator and the first rotating shaft or to transmit a power generated by the internal combustion engine and the first motor-generator to the first rotating shaft;
    a path forming portion configured to form a power transmission path transmitting a power output from the second rotating shaft to an axle;
    a second motor-generator including a second motor rotating shaft connected to the path forming portion;
    a vehicle speed detector configured to detect a vehicle speed;
    an instruction detector configured to detect a speed change instruction changing the vehicle speed; and
    an electric control unit including a microprocessor and a memory configured to control the speed change mechanism, the first motor-generator and the second motor-generator in accordance with the vehicle speed detected by the vehicle speed detector and the speed change instruction detected by the instruction detector, wherein
    the speed change mechanism includes a friction engagement mechanism including mutually engageable and disengageable members and is configured to switch a speed range to a low-speed range when the friction engagement mechanism is disengaged and to switch the speed range to a high-speed range when the friction engagement mechanism is engaged, and
    the microprocessor is configured to perform
        the controlling including controlling the speed change mechanism, the first motor-generator and the second motor-generator so as to switch the speed range to the low-speed range, operate the first motor-generator as a motor and operate the second motor-generator as a generator when the vehicle speed detected by the vehicle speed detector is equal to or greater than a predetermined vehicle speed and an acceleration instruction is detected by the instruction detector, and so as to switch the speed range to the high-speed range, operate the first motor-generator as a generator and operate the second motor-generator as a motor when the vehicle speed detected by the vehicle speed detector is equal to or greater than the predetermined vehicle speed and a deceleration instruction or a termination instruction of an acceleration is detected by the instruction detector.

2. The drive system according to claim 1, further comprising
    a one-way clutch interposed between the second rotating shaft and the second motor rotating shaft in the power transmission path to allow a relative rotation of the second motor rotating shaft with respect to the second rotating shaft in one direction and prohibit the relative rotation in an opposite direction.

3. The drive system according to claim 1, wherein
the friction engagement mechanism is a first friction engagement mechanism, and
the speed change mechanism further includes a second friction engagement mechanism including mutually engageable and disengageable members and is configured to switch the speed range to the low-speed range when the first friction engagement mechanism is disengaged and the second friction engagement mechanism is engaged and to switch the speed range to the high-speed range when the first friction engagement mechanism is engaged and the second friction engagement mechanism is disengaged.

4. The drive system according to claim 3, wherein
the power division mechanism includes a first planetary gear mechanism having a first sun gear connected to the first motor rotating shaft, a first ring gear connected to the first rotating shaft, and a first carrier connected to the output shaft of the internal combustion engine,
the speed change mechanism includes a second planetary gear mechanism having a second sun gear connected to the second rotating shaft, a second ring gear, and a second carrier connected to the first rotating shaft,
one of the first friction engagement mechanism and the second friction engagement mechanism is a brake mechanism configured to brake or non-brake the second ring gear, and
the other of the first friction engagement mechanism and the second friction engagement mechanism is a clutch mechanism configured to integrally join or separate the second sun gear and the second ring gear.

5. The drive system according to claim 1, further comprising
a rotational speed detector configured to detect a rotational speed of the friction engagement mechanism, wherein
the microprocessor is configured to perform
the controlling including controlling the speed change mechanism so as to start engaging of the friction engagement mechanism when the vehicle speed detected by the vehicle speed detector is equal to or greater than the predetermined vehicle speed and the deceleration instruction or the termination instruction of the acceleration is detected by the instruction detector, and thereafter controlling the first motor-generator and the second motor-generator so as to operate the first motor-generator as the generator and to operate the second motor-generator as the motor when a deceleration of the friction engagement mechanism is detected by the rotational speed detector.

6. The drive system according to claim 5, wherein
the microprocessor is configured to perform
the controlling including controlling the speed change mechanism so as to start engaging of the friction engagement mechanism when the vehicle speed detected by the vehicle speed detector is equal to or greater than the predetermined vehicle speed and the deceleration instruction or the termination instruction of the acceleration is detected by the instruction detector, and thereafter controlling the internal combustion engine so as to decrease a torque output from the internal combustion engine to a predetermined value when the deceleration of the friction engagement mechanism is detected by the rotational speed detector.

7. The drive system according to claim 1, further comprising a rotational speed detector configured to detect a rotational speed of the friction engagement mechanism, wherein the microprocessor is configured to perform the controlling including controlling the speed change mechanism, the second motor-generator and the internal combustion engine so as to start engaging of the friction engagement mechanism, operate the second motor-generator as the motor and decrease a torque output from the internal combustion engine to a predetermined value when the vehicle speed detected by the vehicle speed detector is equal to or greater than the predetermined vehicle speed and the deceleration instruction or the termination instruction of the acceleration is detected by the instruction detector, and thereafter controlling the first motor-generator and the internal combustion engine so as to operate the first motor-generator as the generator and to increase the torque output from the internal combustion engine when a deceleration of the friction engagement mechanism is detected by the rotational speed detector.

8. A drive method of a hybrid vehicle, the hybrid vehicle including: an internal combustion engine; a first motor-generator including a first motor rotating shaft; a speed change mechanism including a first rotating shaft and a second rotating shaft to transmit a rotation input from the first rotating shaft to the second rotating shaft while changing a speed of the rotation; a power division mechanism connected to an output shaft of the internal combustion engine, the first motor rotating shaft and the first rotating shaft, respectively, to divide a power generated by the internal combustion engine to the first motor-generator and the first rotating shaft or to transmit a power generated by the internal combustion engine and the first motor-generator to the first rotating shaft; a path forming portion configured to form a power transmission path transmitting a power output from the second rotating shaft to an axle; and a second motor-generator including a second motor rotating shaft connected to the path forming portion, wherein
the speed change mechanism includes a friction engagement mechanism including mutually engageable and disengageable members and is configured to switch a speed range to a low-speed range when the friction engagement mechanism is disengaged and to switch the speed range to a high-speed range when the friction engagement mechanism is engaged, and
the method comprises:
detecting a vehicle speed;
detecting a speed change instruction changing the vehicle speed;
controlling the speed change mechanism, the first motor-generator and the second motor-generator so as to switch the speed range to the low-speed range, operate the first motor-generator as a motor and operate the second motor-generator as a generator when the vehicle speed detected is equal to or greater than a predetermined vehicle speed and an acceleration instruction is detected, and
controlling the speed change mechanism, the first motor-generator and the second motor-generator so as to switch the speed range to the high-speed range, operate the first motor-generator as a generator and operate the second motor-generator as a motor when the vehicle speed detected is equal to or greater than the predetermined vehicle speed and a deceleration instruction or a termination instruction of an acceleration is detected.

* * * * *